United States Patent [19]

von Rybinski et al.

[11] Patent Number: 4,995,998

[45] Date of Patent: Feb. 26, 1991

[54] SURFACTANT MIXTURES AS COLLECTORS FOR THE FLOTATION OF NON-SULFIDIC ORES

[75] Inventors: Wolfgang von Rybinski; Rita Koester, both of Duesseldorf, Fed. Rep. of Germany

[73] Assignee: Henkel Kommanditgesellschaft auf Aktien, Duesseldorf-Holthausen, Fed. Rep. of Germany

[21] Appl. No.: 359,061

[22] Filed: May 30, 1989

[30] Foreign Application Priority Data

May 31, 1988 [DE] Fed. Rep. of Germany ....... 3818482

[51] Int. Cl.[5] .......................... B03D 1/14; C23B 1/00; C11D 1/12; C09K 3/00

[52] U.S. Cl. ...................................... 252/61; 252/559; 252/DIG. 1; 209/166; 209/167; 75/1 T

[58] Field of Search ................... 252/61, 559, DIG. 1; 209/166, 167; 75/1

[56] References Cited

U.S. PATENT DOCUMENTS

| | | | |
|---|---|---|---|
| 3,865,718 | 2/1975 | Tveter et al. | 209/166 |
| 4,526,696 | 7/1985 | Delourme et al. | 252/61 |
| 4,548,729 | 10/1985 | Schmid et al. | 252/174 |
| 4,584,095 | 4/1986 | Unger | 209/166 |
| 4,594,151 | 6/1986 | Delourme et al. | 209/166 |
| 4,612,112 | 9/1986 | Swiatkowski | 209/166 |
| 4,789,466 | 12/1988 | von Rybinski et al. | 209/166 |
| 4,790,931 | 12/1988 | Koester et al. | 209/166 |
| 4,871,466 | 10/1939 | Wang et al. | 252/61 |

FOREIGN PATENT DOCUMENTS

| | | |
|---|---|---|
| 0107561 | 10/1983 | European Pat. Off. . |
| 02011815 | 5/1986 | European Pat. Off. . |
| 0270933 | 11/1987 | European Pat. Off. . |
| 3315951 | 5/1983 | Fed. Rep. of Germany . |
| 782107 | 10/1953 | United Kingdom . |

OTHER PUBLICATIONS

*Soviet Inventions Illustrated* (Jan. 21, 1986) (Derwent Publications, Ltd., 86-005601/01).

*Primary Examiner*—Paul Lieberman
*Assistant Examiner*—James M. Silbermann
*Attorney, Agent, or Firm*—Ernest G. Szoke; Wayne C. Jaeschke; Real J. Grandmaison

[57] ABSTRACT

Fatty alcohol polyglycol ethers terminally blocked by hydrophobic radicals are used as co-collectors together with cationic or ampholytic surfactant components in the flotation of non-sulfidic ores.

11 Claims, No Drawings

SURFACTANT MIXTURES AS COLLECTORS FOR THE FLOTATION OF NON-SULFIDIC ORES

BACKGROUND OF THE INVENTION

1. Field of the Invention

This invention relates to the use of terminally blocked fatty alcohol polyethylene glycol ethers as cocollectors with cationic and/or ampholytic surfactants in the flotation of non-sulfidic ores.

Flotation is a separation technique commonly used in the dressing of mineral crude ores for separating valuable minerals from the gangue. Non-sulfidic minerals in the context of the present invention include, for example, apatite, fluorite, scheelite, baryta, iron oxides and other metal oxides, for example the oxides of titanium and zirconium, and also certain silicates and aluminosilicates. In dressing processes based on flotation, the ore is normally first subjected to preliminary size-reduction, dry-ground, but preferably wet-ground and suspended in water. Collectors are then normally added, often in conjunction with frothers and, optionally, other auxiliary reagents such as regulators, depressors (deactivators) and/or activators, in order to facilitate separation of the valuable materials from the unwanted gangue constituents of the ore in the subsequent flotation process. These reagents are normally allowed to act on the finely ground ore for a certain time (conditioning) before air is blown into the suspension (flotation) to produce a froth at its surface. The collector hydrophobicizes the surface of the minerals so that they adhere to the gas bubbles formed during the activation step. The mineral constituents are selectively hydrophobicized so that the unwanted constituents of the ore do not adhere to the gas bubbles. The mineral-containing froth is stripped off and further processed. The object of flotation is to recover the valuable material of the ores in as high a yield as possible while at the same time obtaining a high enrichment level of the valuable mineral.

2. Discussion of Related Art

Surfactants and, in particular, anionic, cationic and ampholytic surfactants are used as collectors in the flotation-based dressing of ores. In contrast to anionic, cationic and ampholytic surfactants, nonionic surfactants are rarely used as collectors in flotation. In Trans. Inst. Met. Min. Sect. C 84 (1975), pages 34 to 39, A. Doren, D. Vargas and J. Goldfarb report on flotation tests on quartz, cassiterite and chrysocolla which were carried out with an adduct of 9 to 10 mol of ethylene oxide with octylphenol as a collector. Combinations of ionic and nonionic surfactants are also occasionally described as collectors in the relevant literature. Thus, A. Doren, A. van Lierde and J. A. de Cuyper report in Dev. Min. Proc. 2 (1979), pages 86 to 109 on flotation tests carried out on cassiterite with a combination of an adduct of 9 to 10 mol of ethylene oxide with octylphenol and an octadecyl sulfosuccinate. In A. M. Gaudin Memorial Volume, edited by M. C. Fuerstenau, AIME, New York, 1976, Vol. 1, pages 597-620, V. M. Lovell describes flotation tests carried out on an apatite with a combination of tall oil fatty acid and nonylphenol tetraglycol ether.

In many cases, the cationic and ampholytic collectors used for flotation do not lead to satisfactory recovery of the valuable minerals when used in economically reasonable quantities.

Accordingly, an object of the present invention is to provide improved collectors which make flotation processes more economical, i.e. with which it is possible to obtain either greater yields of valuable minerals for the same quantities of collector and for the same selectivity or at least the same yields of valuable materials for reduced quantities of collector.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that certain terminally blocked fatty alcohol polyethylene glycol ethers are extremely effective additives for cationic and ampholytic surfactants, of the type used as collectors for the flotation of non-sulfidic ores, in the role of cocollectors.

More particularly, the present invention relates to the use of a mixture of (a) at least one alkyl or alkenyl polyethylene glycol ether terminally blocked by hydrophobic radicals, and (b) at least one cationic or ampholytic surfactant as a collector in the flotation of non-sulfidic ores.

Component (a) may be selected in particular from alkyl or alkenyl polyethylene glycol ethers corresponding to formula I $$R^1—O—(CH_2CH_2O)_n—R^2 \quad (I)$$

in which $R^1$ is a linear or branched alkyl or alkenyl radical containing 8 to 22 carbon atoms, $R^2$ is a linear or branched alkyl radical containing 1 to 8 carbon atoms or a benzyl radical, and n is a number of from 1 to 30.

The terminally blocked alkyl or alkenyl polyethylene glycol ethers defined above are a class of compounds known from the literature. They may be obtained by known methods of organic synthesis (cf. for example U.S. Pat. No. 2,856,434, German Patents 15 20 647, 25 56 527, U.S. Pat. Nos. 4,366,326, 4,548,729 and European Patent 00 30 397). Above all, these terminally blocked alkyl or alkenyl polyethylene glycol ethers are chemically more stable in alkaline medium than the corresponding polyglycol ethers containing a free hydroxyl group. Since blocked alkyl or alkenyl polyglycol ethers of this type also produce less foam than their starting compounds in aqueous solutions, they have a certain significance for alkaline cleaning processes involving heavy mechanical loads (cf. for example German Patent 33 15 951).

Known fatty alcohols may be used as starting materials for the production of the terminally blocked alkyl or alkenyl polyethylene glycol ethers to be used in accordance with the invention. The fatty alcohol component may consist of linear and branched, saturated and unsaturated compounds of this category containing from 8 to 22 carbon atoms, for example of n-octanol, n-decanol, n-dodecanol, n-tetradecanol, n-hexadecanol, n-octadecanol, n-eicosanol, n-docosanol, n-hexadecanol, n-octadecanol, isotridecanol and isooctadecanol. The fatty alcohols mentioned may individually form the basis of the terminally blocked alkyl or alkenyl polyethylene glycol ethers. However, products based on fatty alcohol mixtures may generally be used, the fatty alcohol mixtures in question being derived from the fatty acid component of fats and oils of animal or vegetable origin. Fatty alcohol mixtures such as these may be obtained in known manner from natural fats and oils, inter alia by transesterification of the triglycerides with methanol and subsequent catalytic hydrogenation of the fatty acid methyl ester. In such case, both the fatty alcohol mixtures obtained during production and also suitable fractions having a limited chain-length per spectrum may be used as the source for the production of the terminally blocked alkyl or alkenyl polyethylene glycol ethers. In addition to the fatty alcohol mixtures obtained from natural fats and oils, it is also possible to use synthetic fatty alcohol mixtures, for example the known Ziegler and oxo fatty alcohols, as starting material for the production process.

Alkyl or alkenyl polyethylene glycol ethers based on $C_{12-18}$ fatty alcohols, i.e. compounds corresponding to formula I, in which $R^1$ is a $C_{12-18}$ alkyl or alkenyl radical, are preferably used as component (a) in the surfactant mixtures to be used in accordance with the invention.

In the production of the terminally blocked alkyl or alkenyl polyethylene glycol ethers, ethylene oxide is added onto the fatty alcohols mentioned in a quantity of from 1 to 30 and preferably 2 to 15, mol per mol of fatty alcohol. The reaction with ethylene oxide is carried out under known alkoxylation conditions, preferably in the presence of suitable alkaline catalysts.

The etherification of the free hydroxyl groups required for terminal blocking of the alkyl or alkenyl polyethylene glycol ethers may be carried out by methods known from the literature (for example from U.S. Pat. No. 2,856,434, German Patents 15 20 647, 25 56 527, U.S. Pat. Nos. 4,366,326, 4,548,729 and European Patent 00 30 397). The etherification of the free hydroxyl groups is preferably carried out under the known conditions of Williamson's ether synthesis with linear or branched $C_1$–$C_8$ alkyl halides or benzyl halides, for example with n-propyl iodide, n-butyl chloride, sec.-butyl bromide, tert.-butyl chloride, amyl chloride, tert.-amyl bromide, n-hexyl chloride, n-heptyl bromide, n-octyl chloride and benzyl chloride. It may be advisable in this regard to use organic halide and alkali in a stoichiometric excess, for example of 100 to 200%, over the hydroxyl groups to be etherified. A corresponding process is described in U.S. Pat. No. 4,548,729. According to the present invention, it is preferred to use alkyl or alkenyl polyethylene glycol ethers which are terminally blocked by n-butyl groups.

Component (b) of the surfactant mixtures to be used in accordance with the invention may be selected from cationic and ampholytic surfactants which are known per se as collectors for the flotation of non-sulfidic ores.

Where cationic surfactants are to be used as component (b) in accordance with the invention, they may be selected in particular from primary aliphatic amines, alkylenediamines substituted by α-branched alkyl radicals, hydroxyalkyl-substituted alkylenediamines and water-soluble acid addition salts of these amines and also quaternary ammonium compounds.

Suitable primary aliphatic amines include, above all, the $C_{8-22}$ fatty amines derived from the fatty acids of natural fats and oils, for example n-octylamine, n-decylamine, n-dodecylamine, n-tetradecylamine, n-hexadecylamine, n-octadecylamine, n-eicosylamine, n-docosylamine, n-hexadecenylamine and n-octadecenylamine. The amines mentioned may be individually used as component (b), although amine mixtures of which the alkyl and/or alkenyl radicals derive from the fatty acid component of fats and oils of animal or vegetable origin are normally used. It is known that amine mixtures such as these may be obtained from the fatty acids obtained by lipolysis from natural fats and oils via the associated nitriles by reduction with sodium and alcohols or by catalytic hydrogenation. Examples include tallow amines or hydrotallow amines of the type obtainable from tallow fatty acids or from hydrogenated tallow fatty acids via the corresponding nitriles and hydrogenation thereof.

The alkyl-substituted alkylenediamines suitable for use as component (b) correspond to formula V

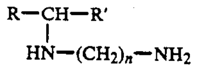

(V)

in which R and R' represent linear or branched alkyl or alkenyl radicals and in which n=2 to 4. The production of these compounds and their use in flotation is described in East Germany Patent 64 275.

The hydroxyalkyl-substituted alkylenediamines suitable for use as component (b) correspond to formula VI

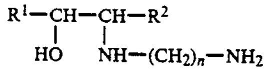

(VI)

in which $R^1$ and $R^2$ are hydrogen and/or unbranched alkyl radicals containing 1 to 18 carbon atoms, the sum of the carbon atoms in $R^1$ and $R^2$ being from 9 to 18, and n=2 to 4. The production of compounds corresponding to formula VI and their use in flotation is described in German Patent 25 47 987.

The amine compounds mentioned above may be used as such or in the form of their water-soluble salts. The salts are obtained in given cases by neutralization which may be carried out both with equimolar quantities and also with more than or less than equimolar quantities of acid. Suitable acids are, for example, sulfuric acid, phosphoric acid, acetic acid and formic acid.

The quaternary ammonium compounds suitable for use as component (b) correspond to formula VII $$[R^1R^2R^3R^4N^{\oplus}]X^{\ominus} \qquad (VII)$$

in which $R^1$ is preferably a linear alkyl radical containing 1 to 18 carbon atoms, $R^2$ is an alkyl radical containing 1 to 18 carbon atoms or a benzyl radical, $R^3$ and $R^4$ may be the same or different and each represent an alkyl radical containing 1 to 2 carbon atoms and X is a halide anion, particularly a chloride ion. In preferred quaternary ammonium compounds, $R^1$ is an alkyl radical containing 8 to 18 carbon atoms; $R^2$, $R^3$ and $R^4$ are the same and represent either methyl or ethyl groups; and X is a chloride ion.

The ampholytic surfactants used as component (b) in accordance with the invention are compounds which contain at least one anionic and one cationic group in the molecule, the anionic groups preferably consisting of sulfonic acid or carboxyl groups, and the cationic groups consisting of amino groups, preferably secondary or tertiary amino groups. Suitable ampholytic surfactants include, in particular, sarcosides, taurides, N-substituted aminopropionic acids and N-(1,2-dicarboxyethyl)-N-alkylsulfosuccinamates.

The sarcosides suitable for use as component (b) correspond to formula VIII

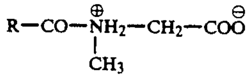

(VIII)

in which R is an alkyl radical containing 7 to 21 carbon atoms, preferably 11 to 17 carbon atoms. These sarcosides are known compounds which may be obtained by known methods. Their use in flotation is described by H. Schubert in "Aufbereitung fester mineralischer Rohstoffe (Dressing of Solid Mineral Raw Materials)", 2nd Edition, Leipzig 1977, pages 310–311 and the literature references cited therein.

The taurides suitable for use as component (b) correspond to formula IX

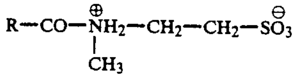

(IX)

in which R is an alkyl radical containing 7 to 21 carbon atoms, preferably 11 to 17 carbon atoms. These taurides are known compounds which may be obtained by known methods. The use of taurides in flotation is known, cf. H. Schubert, loc. cit.

N-substituted aminopropionic acids suitable for use as component (b) correspond to formula X $$R-(NH-CH_2-CH_2)_n-{}^{\oplus}NH_2-CH_2CH_2-COO^{\ominus} \quad (X)$$

in which n may be zero or a number of from 1 to 4, while R is an alkyl or acyl radical containing from 8 to 22 carbon atoms. The afore-mentioned N-substituted aminopropionic acids are also known compounds obtainable by known methods. Their use as collectors in flotation is described by H. Schubert, loc. cit. and in Int. J. Min. Proc. 9 (1982), pages 353–384, more especially page 380.

The N-(1,2-dicarboxyethyl)-N-alkylsulfosuccinamates suitable for use as component b) in the collector mixtures according to the invention correspond to formula XI

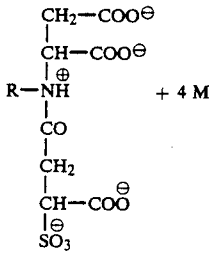

(XI)

in which R is an alkyl radical containing 8 to 22 carbon atoms, preferably 12 to 18 carbon atoms, and M is a hydrogen ion, an alkali metal cation or an ammonium ion, preferably a sodium ion. The N-(1,2-dicarboxyethyl)-N-alkylsulfosuccinamates mentioned are known compounds which may be obtained by known methods. The use of these compounds as collectors in flotation is also known, cf. H. Schubert, loc. cit.

In the mixtures of terminated alkyl or alkenyl polyethylene glycol ethers and cationic and/or ampholytic surfactants to be used in accordance with the invention, the ratio by weight between components (a) and (b) is in the range from 1:20 to 3:1 and preferably in the range from 1:10 to 1:1.

To obtain economically useful results in the flotation of non-sulfidic ores, the surfactant mixture must be used in a certain minimum quantity. However, a maximum quantity of surfactant mixture should not be exceeded, because otherwise frothing is too vigorous and selectivity with respect to the valuable minerals decreases.

The quantities in which the collector mixtures to be used in accordance with the invention are used are governed by the type of ores to be floated and by their valuable mineral content. Accordingly, the particular quantities required may vary within wide limits. In general, the collector mixtures according to the invention are used in quantities of from 50 to 2000 g/metric ton, and preferably in quantities of from 100 to 1500 g/metric ton of crude ore.

In practice, the mixtures to be used in accordance with the invention are used instead of known collectors in the known flotation processes for crude ores. Accordingly, the particular reagents commonly used, such as frothers, regulators, activators, deactivators, etc., are also added to the aqueous suspensions of the ground ores in addition to the collector mixtures. Flotation is carried out under the same conditions as state-of-the-art processes. Reference is made in this regard to the following literature references on the background to ore preparation technology: H. Schubert, Aufbereitung fester mineralischer Stoffe (Dressing of Solid Mineral Raw Materials), Leipzig 1967; B. Wills, Mineral Processing Technology Plant Design, New York, 1978; D. B. Purchas (ed.), Solid/Liquid Separation Equipment Scale-up, Croydon 1977; E. S. Perry, C. J. van Oss, E. Grushka (ed.), Separation and Purification Methods, New York, 1973 to 1978.

The present invention also relates to a process for the separation of crude ores by flotation, in which crushed ore is mixed with water to form a suspension, air is introduced into the suspension in the presence of a collector system and the froth formed is stripped off together with the mineral therein. This process is characterized in that mixtures of (a) at least one alkyl or alkenyl polyethylene glycol ether terminally blocked by hydrophobic radicals, and (b) at least one cationic or ampholytic surfactant are used as collectors.

The collector mixtures to be used in accordance with the invention may be used with advantage in the dressing of such ores as scheelite, baryta, apatite or iron ores.

The following Examples demonstrate the superiority of the mixtures of terminated alkyl or alkenyl polyethylene glycol ethers and cationic or ampholytic surfactants to be used in accordance with the invention over collector components known from the prior art.

The tests were carried out under laboratory conditions, in some cases with increased collector concentrations considerably higher than necessary in practice. Accordingly, the potential applications and in-use conditions are not limited to separation exercises and test conditions described in the Examples. All percentages are percentages by weight, unless otherwise indicated. The quantities indicated for reagents are all based on active substance.

EXAMPLE 1

The material to be floated were tailings from the dressing of iron ore which had the following chemical composition, based on their principal constituents:

8.9% $P_2O_5$
43.3% $SiO_2$
4.0% $Fe_2O_3$

A screening fraction having a particle size of 100 to 200 μm was used. The object of the flotation process was to enrich the phosphorus present a apatite.

The following substances or mixtures were used as collectors:

Collectors A to C

Collectors A to C consisted of mixtures of
(a) oleic acid sarcoside and
(b) a fatty alcohol polyethylene glycol n-butyl ether based on an adduct of 5 mol of ethylene oxide with a $C_{12-18}$ fatty alcohol mixture in a ratio by weight of a to b of 3:1 (A), 2:1 (B) and 1:1 (C).

Collector D (Comparison Substance)

Oleic Acid Sarcoside

The flotation tests were carried out at room temperature in a modified Hallimond tube (microflotation cell) in accordance with B. Dobias, Colloid and Polymer Science, 259 (1981), pages 775 to 776. Each test was carried out with 2 g of ore. Distilled water was used to prepare the pulp. The conditioning time was 15 minutes in each test. During flotation, an air stream was passed through the pulp at a rate of 4 ml/minute. In every test, the flotation time was 12 minutes. The pH value was 9.5. Collectors A to D were each used in a total dosage of 150 g/t.

The results of the flotation tests are shown in Table I.

TABLE I

| Flotation of apatite from iron ore tailings | | | |
|---|---|---|---|
| Collector | Ratio a:b | Recovery of $P_2O_5$ % | $P_2O_5$ Content of concentrate (%) |
| A | 3:1 | 91 | 27.1 |
| B | 2:1 | 102* | 24.2 |
| C | 1:1 | 94 | 27.5 |
| D** | 1:0 | 57 | 29 |

*The recovery value of slightly more than 100% is caused by the inaccuracy of the analytical technique.
**Comparison collector Result By the addition of the fatty alcohol polyethylene glycol n-butyl ether to the known collector, oleic acid sarcoside, recovery is greatly increased for a slight reduction in selectivity with no increase in the collector dosage.

EXAMPLE 2

The flotation batch used was the screening fraction from iron ore tailings described in Example 1.

The following mixtures were used as collectors.

Collectors E to G

Collectors E to G consisted of mixtures of
(a) N-(1,2-dicarboxyethyl)-N-octadecyl succinamate (commercially available), and
(b) a fatty alcohol polyethylene glycol n-butyl ether based on an adduct of 5 mol of ethylene oxide with a $C_{12-18}$ fatty alcohol mixture in a ratio by weight of a to b of 3:1 (E), 2:1 (F) and 1:1 (G).

Collector H (Comparison Collector)

N-(1,2-Dicarboxyethyl)-N-Octadecyl Succinamate (commercially available)

The flotation tests were carried out in the same way as described in Example 1, except that in this case the collector mixtures were each used in the total dosage of 100 g/t.

The results of the flotation tests are shown in Table II.

TABLE II

| Flotation of apatite from iron ore tailings | | | |
|---|---|---|---|
| Collector | Ratio a:b | Recovery of $P_2O_5$ % | $P_2O_5$ Content of concentrate (%) |
| E | 3:1 | 90 | 29.7 |
| F | 2:1 | 82 | 29.8 |
| G | 1:1 | 85 | 29.5 |
| H* | 1:0 | 71 | 31 |

* Comparison collector

Result

Compared with the comparison collector used by itself, the collector mixtures according to the invention provide a distinct increase in the recovery of $P_2O_5$ with only a slight change in selectivity and no increase in the total dosage.

EXAMPLE 3

The screening fraction from iron ore tailings described in Example 1 was used as the flotation batch.

The following substances and mixtures were used as collectors:

Collectors I to K

Collectors I to K consisted of mixtures of
(a) N-(1,2-dicarboxyethyl)-N-octadecylsuccinamate, and
(b) a fatty alcohol polyethylene glycol n-butyl ether based on an adduct of 7 mol of ethylene oxide with 1 mol of a $C_{12-18}$ fatty alcohol mixture.

The flotation tests were carried out in the same way as described in Example 1, except that in this case the total collector dosage in each test was 100 g/t.

The results of the flotation tests are shown in Table III. The results obtained with collector H in Example 2 are shown for comparison in Table III.

TABLE III

| Flotation of apatite from iron ore tailings | | | |
|---|---|---|---|
| Collector | Ratio a:b | Recovery of $P_2O_5$ % | $P_2O_5$ Content of concentrate (%) |
| I | 3:1 | 98 | 29.1 |
| J | 2:1 | 99 | 29.0 |
| K | 1:1 | 96 | 29.0 |
| H* | 1:0 | 71 | 31.0 |

*Comparison collector

Result

Compared with the N-(1,2-dicarboxyethyl)-N-octadecylsuccinamate (H*) used by itself, the mixtures according to the invention provide a distinct increase in the recovery of $P_2O_5$ with only a slight reduction in selectivity and no increase in total dosage.

EXAMPLE 4

Pure quartz sand was used as a model of an ore which can be floated with cationic surfactants. The particle size of the flotation batch was below 250 μm.

A mixture of (a) lauryl trimethyl ammonium chloride, and (b) a fatty alcohol polyethylene glycol n-butyl ether based on an adduct of 5 mol of ethylene oxide with 1 mol of a $C_{12-18}$ fatty alcohol in a ratio by weight of a to b of 2:1 (collector L) was used as the collector according to the invention. Lauryl dimethyl ammonium chloride with no addition was used as the comparison collector (collector M).

The flotation tests were carried out in the same way as described in Example 1, except that in this case the collector mixture and the collector were each used in a total dosage of 100 g/t. The flotation time was 2 minutes and 12 minutes, respectively.

The results obtained are shown in Table IV.

TABLE IV

| | Flotation of pure quartz sand | | |
|---|---|---|---|
| | Ratio | Recovery of quartz sand | |
| Collector | a:b | after 2 mins. | after 12 mins. |
| L | 2:1 | 42 | 62 |
| M* | 1:0 | 16 | 43 |

*Comparison collector

Result

Compared with the lauryl trimethyl ammonium chloride used by itself, the collector mixture according to the invention in the same dosage produces a marked increase in the total recovery, particularly for short flotation times. Accordingly, addition of the fatty alcohol polyethylene glycol n-butyl ether also has a positive effect on the flotation kinetics.

We claim:

1. A composition for the flotation and collection of non-sulfidic ores, said composition comprising a mixture of (a) at least one alkyl or alkenyl polyethylene glycol ether terminally locked by hydrophobic radicals, and (b) at least one cationic or ampholytic surfactant, wherein the ratio by weight of component (a) to component (b) is in the range from about 1:20 to about 3:1.

2. A composition as in claim 1 wherein said component (a) is at least one alkyl or alkenyl polyethylene glycol ether corresponding to formula I $$R^1{-}O{-}(CH_2CH_2O)_n{-}R^2 \qquad (I)$$

in which $R^1$ is a linear or branched alkyl or alkenyl radical containing 8 to 22 carbon atoms, $R^2$ is a linear or branched alkyl radical containing 1 to 8 carbon atoms or a benzyl radical, and n is a number of from about 1 to about 30.

3. A composition as in claim 2 wherein in formula I, $R^1$ is an alkyl or alkenyl radical containing 12 to 18 carbon atoms.

4. A composition as in claim 2 wherein in formula I, n is a number of from about 2 to about 15.

5. A composition as in claim 2 wherein in formula I, $R^2$ is an n-butyl radical.

6. A composition as in claim 1 wherein said component (b) is at least one cationic surfactant selected from the group consisting of a primary aliphatic amine, an alkylenediamine substituted by an α-branched alkyl radical, a hydroxyalkylsubstituted alkylenediamine and water-soluble addition salts of said amines, and a quaternary ammonium compound.

7. A composition as in claim 6 wherein said alkyl-substituted alkylenediamine corresponds to formula V

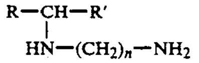

(V)

in which R and R' represent saturated or unsaturated, linear or branched alkyl or alkenyl radicals and in which n=2 to 4.

8. A composition as in claim 6 wherein said hydroxy-alkyl-substituted alkylenediamine corresponds to formula VI

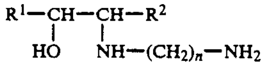

(VI)

in which $R^1$ and $R^2$ are hydrogen or unbranched alkyl radicals containing 1 to 18 carbon atoms, the sum of the carbon atoms in $R^1$ and $R^2$ being from 9 to 18, and n=2 to 4.

9. A composition as in claim 6 wherein said quaternary ammonium compound corresponds to formula VII $$[R^1R^2R^3R^4N^{\oplus}]X^{\ominus} \qquad (VII)$$

in which $R^1$ is a linear alkyl radical containing 1 to 18 carbon atoms, $R^2$ is an alkyl radical containing 1 to 18 carbon atoms or a benzyl radical, $R^3$ and $R^4$ may be the same or different and each represent an alkyl radical containing 1 to 2 carbon atoms and X is a halide anion.

10. A composition as in claim 1 wherein said component (b) is at least one ampholytic surfactant selected from the group consisting of a sarcoside, a tauride, N-substituted aminopropionic acid, and N-(1,2-carboxyethyl)-N-alkylsulfosuccinamate.

11. A composition as in claim 1 wherein the ratio by weight of component (a) to component (b) is in the range from about 1:10 to about 1:1.

* * * * *